United States Patent [19]

Gavin et al.

[11] Patent Number: 4,681,901
[45] Date of Patent: Jul. 21, 1987

[54] NEOPRENE FOAM OF INCREASED CONTINUOUS VOLUME

[75] Inventors: F. Paul Gavin, Mason, N.H.; David F. Brigham, Elliottsville Plantation, Me.; Ann H. Gavin, Mason, N.H.

[73] Assignee: ModuForm, Inc., Fitchburg, Mass.

[21] Appl. No.: 856,295

[22] Filed: Apr. 25, 1986

[51] Int. Cl.[4] .............................................. C08J 9/24
[52] U.S. Cl. ....................................... 521/54; 264/25; 264/26; 264/101; 264/109; 264/122; 264/DIG. 7; 428/407; 521/59; 521/140; 521/150
[58] Field of Search .................... 521/54, 59, 140, 150; 428/407; 264/25, 26, 101, 109, 122, DIG. 7

[56] References Cited

U.S. PATENT DOCUMENTS

| | | | |
|---|---|---|---|
| 1,950,432 | 3/1934 | Carothers et al. | 526/232.1 |
| 3,393,187 | 7/1968 | Hargreaves et al. | 526/224 |
| 3,660,368 | 5/1972 | Hargreaves | 522/185 |
| 3,740,354 | 6/1973 | Dearmont | 521/54 |
| 3,808,183 | 4/1974 | Branlard et al. | 525/350 |
| 3,838,141 | 9/1974 | Turner | 526/214 |
| 4,240,998 | 12/1980 | Lichter et al. | 521/54 |
| 4,241,190 | 12/1980 | Lichter et al. | 521/54 |
| 4,303,602 | 12/1981 | Lichter et al. | 521/54 |
| 4,307,200 | 12/1981 | Lichter et al. | 521/54 |

OTHER PUBLICATIONS

Kirk-Othmer John Wiley & Sons, The Encyclopedia of Chemical Technology 1981, vol. 8, pp. 515–531.
NERAC, List of Citations obtained from a reference search done in Storrs, Connecticut.

Primary Examiner—Morton Foelak
Attorney, Agent, or Firm—Hamilton, Brook, Smith & Reynolds

[57] ABSTRACT

The invention claimed here comprises a process for producing neoprene foam structures which are greater than four inches in diameter. The claimed invention also comprises a structure of neoprene with a thickness greater than about four inches composed of one continuous mass of adhesively bound neoprene particles.

31 Claims, 1 Drawing Figure

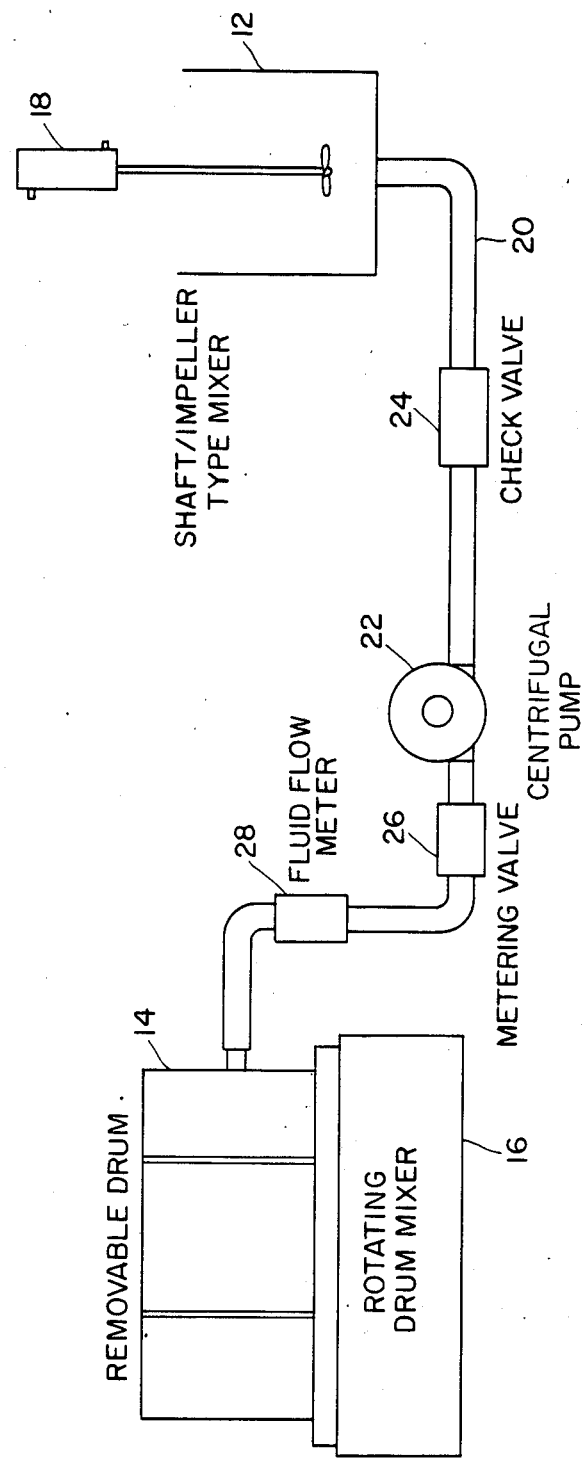

NEOPRENE FOAM OF INCREASED CONTINUOUS VOLUME

DESCRIPTION

1. Background of the Invention

Neoprene or polychloroprene polymers of varying types and properties are well known in the art. The first neoprene was synthesized in 1930 by A. M. Collins when he polmerized 2-chloro-1,3-butadiene. This rubbery polymer was then able to be vulcanized or cured. Through the years, the use of these polymers has continued to increase to an annual worldwide consumption greater than 300,000 metric tons or about 5% of the world market for elastomers. Neoprene has enjoyed this growth because it has filled much of the need for an elastomer resistant to oxidation, oil and heat.

The broad range of physical and chemical properties which have been available in the neoprene homo and copolymers have permitted neoprenes to fulfill the requirements of many applications. This versatility arose from the chemistry of free-radical emulsion polymerization of 2-chloro-1, 3-butadiene. However, Neoprene, as sold by its manufacturers, has been a raw synthetic rubber. To convert it into useful objects, it has been necessary to mix or compound it with selected chemicals, fillers and processing aids. The resulting "compound" is then shaped, or molded, and finally vulcanized. The properties of the finished product have depended on the exact type and amount of neoprene and the compounding ingredients. Hence, the physical and chemical properties have been closely related to the compounding recipe.

Among the many forms of solid neoprene is solid neoprene foam. A solid neoprene foam is a foamed latex rubber which is formed by bubbling gas (usually air) through the neoprene latex mixture (as manufactured by the DuPont Corporation in the United States) before and during vulcanization. Vulcanization is the process by which the material is cured. Neoprene can be vulcanized by practically all the methods used by the rubber and cable industries. Solid neoprene foams are used in furniture such as mattresses and in cushions for sofas because the foam is flame retardent.

However, manufacturers and processors have had to contend with a major limitation in the production of neoprene foam. This has been the inability of manufacturers and processors to produce solid neoprene foam which has a thickness greater than about four inches. Presently, neoprene structures greater than four inches in thickness can only be formed by laminating several sheets of neoprene together to produce the desired thickness. Also, neoprene sheets, called vonar, can be wrapped around cushions of urethane. This is undesirable because urethane is not flame retardent. Another limitation in the use of neoprene has been the difficulty in producing complex shapes because neoprene foam per se has not been able to be molded.

SUMMARY OF THE INVENTION

This invention comprises a relatively low cost economical process for manufacturing an adhesively bound, continuous mass of neoprene foam with new properties. A continuous structure is a structure that has a defined solid shape, is uniform throughout, and can be formed into a complex shape. The adhesively bound, continuous neoprene structure is formed by chopping neoprene foam to a desired screen size, mixing the chopped screened foam with neoprene latex, (or other elastomeric latex), an anti-foam agent and an algecide (the anti-foam agent and algecide are optional). The resultant mixture is then poured or injected into a mold of any desired size and shape. The mixture is then dried by heat and/or vacuum and the neoprene structure is removed from the mold. The heat source can be a convection heater, induction heater or the neoprene can be dried by microwave or radio frequency energy.

This invention also comprises structures of neoprene, such as furniture cushioning means, that are comprised of one continuous mass of adhesively bound neoprene particles.

BRIEF DESCRIPTION OF THE DRAWINGS

FIG. 1 illustrates an apparatus for mixing a neoprene foam mixture.

DETAILED DESCRIPTION OF THE INVENTION

In accordance with this invention, neoprene foam products of relatively high density may be made using the following process.

1. Foam from various sources (preferably scrap material) is chopped using a granulator, such as, a Granulator Model number JC-10 made by WOR-TEX of Hillsboro, Tex. to a desired screen size, preferably in the range of ¼" to 2".

2. This chopped foam is mixed with a binder such as a synthetic latex adhesive, (in the examples below a synthetic neoprene latex BN-72-56 manufactured by Basic Adhesive, Inc. of Brooklyn, N.Y. was used but any comparable elastomeric adhesive can be used). The chopped neoprene foam and adhesive can be mixed together in a number of different ratios, for example 1 lb of chopped neoprene foam to 1.54 lbs of adhesive, 1 lb of chopped neoprene foam to 1.17 lbs of adhesive, and 1 lb of chopped neoprene foam to 0.77 lbs of adhesive.

3. An anti-foaming agent is added during mixing (in the examples below Hodag Antifoam PX-218 produced by Hodag Chemical Corporation of Skokie, Ill., was used but any comparable antifoam agent can be used). The addition of an anti-foaming agent is optional, but facilitates processing.

4. An algecide such as Micro-Check Grade 11BD (non metallic isothiazoline) from Ferro Chemical Corporation of Bedford, Ohio, (a comparable algecide can be used) is also added to the mixture during compounding to inhibit mold or algae growth. The addition of an algecide is also optional but gives longer life to the neoprene product by eliminating the problems associated with algae and fungi.

FIG. 1 illustrates an apparatus for mixing a neoprene foam mixture. There are two mixing containers 12 and 14. Into container 12 are placed water, adhesive, antifoaming agent and algecide. These ingredients are mixed by mixer 18 for about 25 minutes at a temperature of between 70°–74° F.

Chopped neoprene foam is placed into the rotating, removable drum 14 and this material is mixed by the rotating drum mixer 16 which rotates drum 14. Container 12 and drum 14 are maintained in fluid communication by pipe 20. After the ingredients in container 12 have been thoroughly mixed for at least 20 minutes, they are pumped out of container 12 through pipe 20 and into drum 14 by centrifugal pump 22. The pumping of material from container 12 to drum 14 is monitored and regulated by fluid flow meter 28, metering valve 26, and check valve 24. The resultant mixture in drum 14 is mixed together for at least 15 minutes at a temperature between 70°-74° F. producing a neoprene slurry.

The resulting slurry is transferred into a vinyl shell supported in a rigid mold of any desired shape or size. In a preferred transfer method, an auger type eccentric pump, Model SP25 distributed by the Hayes Pump Company of Concord, Mass. is used. The previously mixed neoprene slurry is placed into the hopper of the pump. A semi-rigid PVC hose is attached to the discharge tube of the pump, the other end of the hose is lodged into the vinyl shell or mold to be filled. The flow of material into the mold is maintained at approximately 4 pounds per minute. The amount of neoprene slurry transferred into a mold in order to achieve proper filling must be determined by experiment.

The resultant neoprene products are characterized by several physical properties. They are:
 (1) Density
 (2) Indentation Load Deflection (ILD)
 (3) Sag Factor; and
 (4) Tear Strength (1) Density is the mass of material per unit volume (expressed as pounds per cubic foot).

(2) Indentation Load Deflection is the force required to depress a 0.79 square inch metal plate into a 4" thick slab of the material in question so that the total depth of penetration is equal to 25% of the total slab thickness (in this case 1").

(3) Sag Factor is a physical property which is also evaluated on a 4" slab. It is the ratio between the 65% penetration force and the 25% penetration force. The ILD and the sag factor are quantitive measurements which indicate the relative suitability that a material has for use as a cushion for seating. These factors measure the firmness of the material.

(4) Tear Strength is the force necessary to pull apart a standard sample of material which has a small cut approximately ¼" long started in it.

The above described process and products are illustrated by the following examples.

EXAMPLE 1

Materials Used 100 pounds chopped neoprene foam
117 pounds of neoprene latex adhesive
14 pounds of antifoaming agent
65.6 pounds of tap water
1 pound of algecide

Procedure

1. In the open top mixing container 12 of FIG. 1 the following materials were introduced in the order listed:
 (a) 65.6 pounds of tap water (shaft/impeller mixer 18 was engaged at this point)
 (b) 117 pound of neoprene latex adhesive
 (c) 14 pounds of antifoaming agent
 (d) 1 pound of algecide 2. These materials were mixed in container 12 of FIG. 1 at between 70°-74° F. for at least twenty minutes after all of the components were added.

3. 100 pound of neoprene foam was then added to the rotating drum mixer 14 of FIG. 1. The neoprene foam had been chopped to pieces ranging in size from ¼" to 2".

4. The material which was mixed in the open top mixing container 12 for approximately 20 minutes was transferred from container 12 through the connecting pipes 20 by means of pump 22 into the rotating drum mixer 4. This mixture was pumped at the approximate rate of three gallons per minute while the neoprene foam was being tumbled in the rotating drum mixer 4.

5. Mixing of the material in the rotating drum was continued at between 70°-74° F. form at least fifteen minutes after all the material had been transferred from the open top mixer 12 to the rotating drum mixer 14.

6. The material was then transferred into a vinyl shell supported in a fiberglass mold. The vinyl shell had five openings, one large and four small, through which water vapor could escape during drying. The four smaller openings were sealed while the vinyl shell was being filled with the neoprene slurry mix. The large hole was kept open. A semi-rigid hose form the transfer unit was placed into this opening and the neoprene slurry was pumped from the transfer unit into the vinyl shell.

7. The resultant structure was dried by a radio frequency glue dryer, the use of which is explained below.

Resultant Physical Properties

Density 17.0 pounds per cubic foot
ILD 45-50 lbs.
Tear Strength 10.0 pounds
Sag Factor Approximately 3.8

EXAMPLE 2

Materials Used 100 pounds chopped neoprene foam
154 pounds neoprene latex adhesive
15.2 pounds antifoaming agent
65.6 pounds of tap water
1 pound of algecide

Procedure

The procedure utilized in this example was the same procedure set forth in Example 1.

Resultant Physical Properties

Density 21.5 pounds per cubic foot
ILD 75-70 lbs.
Tear Strength 16.0 pounds
Sag Factor Approximately 4.2

EXAMPLE 3

Materials Used 100 pounds of chopped neoprene foam
77 pounds of neoprene latex adhesive
13 pounds antifoaming agent
65.6 pounds of tap water
1 pound of algecide

Procedure

The procedure utilized in this example was the same procedure set forth in Example 1.

Resultant Physical Properties

Density 13.2 pounds per cubic foot
ILD 25-20 lbs.
Tear Strength 3.5 pounds
Sag Factor Approximately 2.0.

As can be seen from these examples, the ILD, sag factor and density increase as the ratio of neoprene foam to adhesive decreases. Using this process, one is now able to produce solid neoprene foam cushions which are greater than four inches without laminating. This is better than wrapping cushions of urethane with vonar or similar items because urethane is not fire retardant. The neoprene mixture can be pumped into molds. Steel or wood inserts can be placed into the molds in which the neoprene foam mixture is pumped, thus incorporating the inserts into the neoprene foam structures giving the resultant foam greater support and mechanical structure. The resulting foam can be dried by air, vacuum, convection heat, microwave, moderate or longer wavelength radiation.

The neoprene structures of the three previous examples were dried by using a 5 kW radio frequency glue dryer manufactured by Rosenquist Inc. of West Wilksboro, N.C. This dryer has plates through which the radio waves are emitted. These metal plates were placed around the structure to be dried and the radio frequency dryer was turned on at 5 kW to raise the temperature of the material to 212° F. until the material was dry.

The process of this invention produces a neoprene product of increased density capable of having a continuous structure greater than four inches in thickness. It can be used to produce a foam which is extremely useful in furniture, e.g., couches and bed mattresses. Flame resistant structural materials such as walls and dividers can be made from the neoprene products of this invention.

Equivalents

Those skilled in the art will recognize, or be able to ascertain using no more than routine experimentation, many equivalents to the specific embodiments of the invention described herein. Such equivalents are intended to be encompassed by the following claims.

We claim:

1. A process for manufacturing neoprene structures, which consists essentially of:
    (a) chopping neoprene foam into pieces;
    (b) mixing the chopped neoprene foam with an neoprene latex adhesive;
    (c) forming the neoprene mixture into a desired shape and structure and providing means by which said neoprene mixture can retain said shape and structure; and
    (d) drying the mixture.

2. A process as recited in claim 1, wherein water algecide and an antifoam agent are mixed with the chopped neoprene foam and neoprene latex adhesive mixture of step "b".

3. A process as recited in claim 2, wherein the neoprene latex adhesive, antifoam agent, algecide and water are mixed together first in one container, and then transferred to another container containing previously chopped and mixed neoprene, wherein all of the components are mixed together.

4. A process as recited in claim 1, wherein the mixture of step "d" is dried by radio frequency drying.

5. A process as recited in claim 1, wherein the shape and structure of the neoprene material are formed and retained by means of a mold into which the resultant neoprene mixture of step "b" is pumped.

6. A process as recited in claim 5, wherein the mold is a vinyl shell or similar material containing water vapor vent holes to allow water vapor to escape during drying.

7. A process as recited in claim 1, wherein the ratio of 1 lb of chopped neoprene foam to 1.54 lbs of neoprene latex adhesive is used in said process.

8. A process as recited in claim 1, wherein 100 pounds of chopped neoprene foam, 154 pounds of neoprene latex adhesive, 15.2 pounds of anti-foaming agent, 65.6 pounds of tap water and 1 pound of algecide are used in step "b".

9. A process as recited in claim 1, wherein the ratio of 1 lb of chopped neoprene foam to 1.17 lbs of neoprene latex adhesive is used in said process.

10. A process as recited in claim 1, wherein 100 pounds of chopped neoprene foam, 117 pounds of neoprene latex adhesive, 14 pounds of antifoaming agent, 65.6 pounds of tap water and 1 pound of algecide are used in step "b".

11. A process as recited in claim 1, wherein the ratio of 1 lb of chopped neoprene foam to 0.77 lbs of neoprene latex adhesive is used in said process.

12. A process as recited in claim 1, wherein 100 pounds of chopped neoprene foam, 77 pounds of neoprene latex adhesive, 13 pounds of anti-foaming agent, 65.6 pounds of tap water and 1 pound of algecide are used in step "b".

13. A structure of neoprene consisting essentially of one continuous mass of neoprene latex adhesively bound neoprene particles.

14. Furniture having cushioning means, said cushioning means being composed of a structure of neoprene consisting essentially of one continuous mass of neoprene latex adhesively bound neoprene particles.

15. A process as recited in claim 1, wherein the neoprene foam of step "a" is chopped into pieces having a screen size in the range of ¼" to 2".

16. The product of the process as recited in claim 1.

17. A process as recited in claim 1, wherein an antifoam agent is mixed with the chopped neoprene foam and neoprene latex adhesive of step "b".

18. A process as recited in claim 1, wherein the mixture of step "b" consists essentially of about 60% neoprene latex adhesive and about 40% pieces of chopped neoprene foam.

19. A process as recited in claim 1, wherein the mixture of step "b" consists essentially of about 54% neoprene latex adhesive and about 46% pieces of chopped neoprene foam.

20. A process as recited in claim 1, wherein the mixture of step "b" consists essentially of about 44% neoprene latex adhesive and 56% pieces of chopped neoprene foam.

21. A process as recited in claim 1, wherein no pressure is applied externally to the neoprene structure of step "c".

22. The product of the process of claim 7.

23. The product of the process of claim 9.

24. The product of the process of claim 11.

25. A process for manufacturing neoprene structures, which consists essentially of:
    (a) chopping neoprene foam into pieces and mixing the pieces of neoprene in a first container;
    (b) mixing neoprene latex adhesive an antifoam agent and an algecide together in a second container;
    (c) mixing the pieces of neoprene of step "a" and the mixture of step "b" together;
    (d) transferring the resultant mixture of step "c" into a mold; and (e) drying the neoprene mixture contained within the mold of step "d" by means of electromagnetic energy.

26. A process as recited in claim 25, wherein the neoprene foam of step "a" is chopped into pieces having a screen size ranging from about ¼" to 2".

27. A process as recited in claim 25, wherein no pressure is applied externally to the mixture of neoprene within the mold of step "d".

28. The product of the process as recited in claim 24.

29. A process for manufacturing neoprene structures, which consists essentially of:
(a) mixing pieces of neoprene foam, neoprene latex adhesive and an antifoam agent together;
(b) transferring the resultant mixture into a mold; and
(c) drying the neoprene mixture by means of electromagnetic energy.

30. A process as recited in claim 29, wherein no pressure is applied externally to the neoprene mixture in the mold of step "b".

31. The product of the process of claim 29.

* * * * *